United States Patent Office 3,586,650
Patented June 22, 1971

3,586,650
POLYURETHANE RESINS PREPARED FROM
ALKOXYLATED GLUCOSE DERIVATIVES
John P. Gibbons, Western Springs, and Lawrence
Wondolowski, Lemont, Ill., assignors to CPC International Inc.
No Drawing. Filed Nov. 15, 1967, Ser. No. 683,162
Int. Cl. C08g 22/14, 22/44, 23/10
U.S. Cl. 260—2.5
17 Claims

ABSTRACT OF THE DISCLOSURE

Covers polyurethane resins. Particularly covers polyurethane resins formed by reacting an organic polyisocyanate and an alkoxylated monoacetone glucose or ethylene glucose having a molecular weight ranging from about 350 to about 5000 and a hydroxyl number ranging from about 40 to about 500. The resins may be in the form of coatings or foams, either of the flexible or rigid type. Also covers a method of preparing the above polyurethanes.

---

The reaction of polymeric materials containing free hydroxy groups with organic polyisocyanates is the basis for the industrial production of polyurethane resins including those used as coatings and others utilized in cellular plastic or foam form. Until about the middle of the 1950's the bulk of the commercial products manufactured were made with the hydroxy containing polyester resins and organic polyisocyanates as the main constituents of the polyurethane resins. Those hydroxy containing polyester resins produced from aliphatic type dibasic acids, such as adipic acid, and a glycol were used in the manufacture of flexible products. On the other hand, those polyester resins made from a mixture of dibasic acids, such as adipic and phthalic acids, and a triol, for example, glycerol or trimethylolpropane, were employed for the preparation of rigid polyurethane foams. In the latter products, the triol increased the functionality or cross-linking capacity of the resins to impart thereto greater rigidity, while the cyclic phthalic structure increased the high-temperature resistance of the polymers.

Recently, hydroxy terminated polyether resins have to a great extent replaced the relatively more expensive polyester resins in the manufacture of polyurethane polymers and cellular plastics. Products formed from the polyethers have certain improved desirable properties such as better hydrolytic stability.

However, even resort to use of these hydroxy terminated polyether resins in making polyurethanes has resulted in products deficient in one or more desired properties. For example, many materials of this type have materially less dimensional stability than is desired or even is required in some instances of formation of rigid foams. Dimensional stability particularly suffers under conditions of high relative humidity. Again, polyurethanes of this class or others utilized in flexible foam form possess a number of other drawbacks, such as inferior elongation, tear strength or compression set.

It therefore becomes an object of the invention to provide a new class of polyurethane resins.

Another object of the invention is to provide polyurethane resins in coating or foam form made by reaction of organic polyisocyanates and specific hydroxy terminated polyethers.

A still further object of the invention is to provide polyurethane foams, particularly of the rigid type, which exhibit excellent dimensional stability even under a condition of high relative humidity.

Still another object is to provide flexible polyurethane foams which exhibit good tear strength, elongation and impression set.

Another object of the invention is to provide a method of making polyurethane foams by reaction of a polyisocyanate and specifically synthesized polyols.

Other objects will appear hereinafter.

BRIEF SUMMARY

In accordance with the invention we have discovered a new and improved class of polyurethane resins. Broadly speaking, these are made by forming a mixture of an organic polyisocyanate and particular polyols having molecular weights ranging from about 350 to about 5000 and hydroxyl numbers ranging from about 40 to about 500 and reacting said mixture. These specific polyols are alkoxylated monoacetone glucoses and alkoxylated ethylene glucoses.

For best results, the resin is formed by making up a reaction mixture comprised of 1–3 parts of said polyisocyanate and 1–3 parts of either polyol or various blends of the two polyols. In a still further embodiment, the above polyols or blends thereof may be further blended with one or more additional differing polyol or polyhydric compound and this last blend reacted with a polyisocyanate or blend of polyisocyanates. Resins may be so formed so that they have utility either as coatings or may be so reacted in presence of a foaming agent to produce flexible or rigid foams. After the reaction is considered complete, the resins are then cured in a conventional manner.

GENERAL DESCRIPTION

Alkoxylated monoacetone glucose

One of the polyols used to form a polyurethane resin of the invention is an alkoxylated monoacetone glucose. It is believed that this particular polyol having a molecular weight range and hydroxyl number within the aforementioned ranges is also novel per se.

The basic material utilized in forming this polyol is, of course, 1,2-monoacetone glucose itself, which has the formula

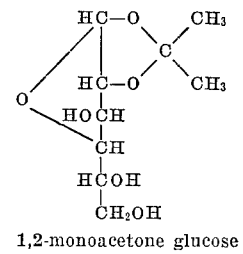

1,2-monoacetone glucose

This is a well-known material and needs little elaboration. It is usually formed by reacting glucose with acetone in the presence of sulfuric acid catalyst to form the diacetone glucose derivative, which is then hydrolyzed to the 1,2-monoacetone glucose by breaking the acetal linkage of the primary hydroxyl. The isolated, 1,2-monoacetone glucose contains one primary and two secondary hydroxy groups. The derivative itself is soluble in water, has a melting point of 161° C. and good stability to aqueous alkalis. A typical method of making this material is outlined in "Polarimetry, Saccharimetry and the Sugars" by F. J. Bates et al., circular of the National Bureau of Standards, C440, pages 483 and 484.

The alkylene oxide addition products of 1,2-monoacetone glucose are prepared by reacting ethylene oxide, propylene oxide, butylene oxide or mixtures thereof with the monoacetone glucose. This reaction is carried out in a suitably equipped reactor in the presence of a small amount of catalyst by adding the alkylene oxide to the monoacetone glucose, usually with agitation and preferably in a liquid state. If desired, the monoacetone glucose can be slurried in inert solvent, such as toluene, xylene, or other suitable hydrocarbon solvent, and then reacted with the alkylene oxide. To prevent formation of undesirable by-products, the reaction is carried out in the absence of water, either at atmospheric conditions, or preferably under pressure and within a temperature range of 100° C. to 205° C., particularly when more than two mols of alkylene oxide per mol of monoacetone glucose is being reacted. Water can be used as a solvent for the monoacetone glucose during the initial stages of alkylene oxide addition, i.e., up to the addition of two mols of alkylene oxide per mol of monoacetone glucose. However, as soon as a ratio of preferably up to 1.0 mol of alkylene oxide has been reacted, introduction of the alkylene oxide should be stopped and the water removed by distillation before resuming the alkylene oxide addition. Under these conditions, undesirable by-product formation is negligible.

Any of the typically known catalysts for these reactions can be used for the addition of the alkylene oxide to the monoacetone glucose. Alkaline catalysts are preferred. These are usually the alkali metal catalysts, although tertiary amine type catalysts can also be employed. The quantity of catalyst necessary for suitable reaction is usually in the range of 0.002 to 2.0% by weight on total reactants. The catalyst can be added all at once initially, or in increments throughout the course of the reaction.

As noted above, the alkylene oxide addition products of monoacetone glucose useful in carrying out this invention have an average molecular weight ranging from about 350 to about 5000. The average molecular weight of the alkylene oxide addition products of the monoacetone glucose can be determined by the conventional analysis for hydroxyl content. This gives the hydroxyl concentration (hydroxyl number) per unit weight. This method can also be used for determining hydroxyl concentration of mixtures of the alkylene oxide addition products of monoacetone glucose with other hydroxy containing materials. The hydroxyl number is defined in terms of milligrams of potassium hydroxide per gram of hydroxyl containing material. It can be determined analytically by reacting an excess of acetic anhydride in pyridine at reflux with the hydroxyl groups present in the polyol. The excess unreacted acetic anhydride is then titrated with standard sodium hydroxide solution. The molecular weight is equal to the functionality of the resin multiplied by 56,100 divided by the hydroxyl number. The alkoxylated monoacetone glucose polyols useful here have hydroxyl numbers ranging from about 40 to about 500.

Alkoxylated ethylene glucose

Again, the basic starting material or polyols useful in the invention is 1,2-ethylene glucose, which has the formula

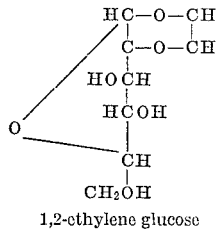

1,2-ethylene glucose

This material is known and is typically made by reacting glucose with ethylene halohydrin in the presence of an acidic catalyst to form the beta-haloethyl glucoside. These are then cyclized to a mixture of bicyclic alpha and beta-1,2-ethylene glucoses by refluxing in the presence of alcoholic sodium hydroxide. The isolated alpha and beta-1,2-ethylene glucoses have melting points of 201° C. and 128° C. respectively. These glucoses are water soluble and have excellent stability to boiling aqueous mineral acids and alkalis. The alpha and beta form are both useful here, and will be simply referred to as ethylene glucose for purpose of simplicity. A useful procedure in making the 1,2-ethylene glucose is described by Helferich, B. and Werner, J., Chemische berichte, volume 75, pages 949 and 1446 (1942).

In order to form the alkoxylated ethylene glucose product, one only needs to react ethylene glucose with an alkylene oxide in the manner just described above. The procedures set out with respect to forming an alkoxylated monacetone glucose are equally applicable here.

The alkoxylated ethylene glucoses having a molecular weight range and hydroxyl number within the stated limits are also believed to be novel in and of themselves.

Additional polyhydric reactants

As noted above, the source of polyol used in making the polyurethane resins may be either an alkoxylated monacetone glucose or an alkoxylated ethylene glucose. Likewise, blends of these two materials in varying proportions may be made and utilized as the reactant source. When a blend of these two materials is constituted, usually the amount of each ranges from about 10 to about 90% by weight based on the total blend weight.

In addition, the alkoxylated monoacetone glucose or alkoxylated ethylene glucose or blends of the two as set out above may be further combined with an additional compound containing a plurality of hydroxyl groups. This polyhydric compound may also contain ether linkages whereby a polyol is constituted.

Thus, for example, the additional polyhydric reactant used in conjunction with the alkoxylated compounds concerned with here may include starch, glycosides, such as methyl glucoside, diacetone glucose, dextrose, corn syrup, sucrose, maltose, high maltose syrups, cyclodextrin, etc. Still other useful polyhydric compounds include glycerin and glycols. Another useful source of hydroxy content includes the hydroxy-containing polyester resins.

Again, additional sources of hydroxyl content useful here may be polyols formed by reaction of the above polyhydric compounds or others or mixtures thereof with alkylene oxides, such as ethylene, propylene and butylene oxide or mixtures of these last named materials. Thus, such polyols as hydroxy-terminated polyethers of all types, alkoxylated phosphorus compounds, alkoxylated hydroxy amines, and starch polyethers may be used here.

When an additional polyhydric compound is utilized as a reactant with the organic polyisocyanate in combination with the polyols of the invention, usually the blend is composed of 10–90% by weight of either the alkoxylated monoacetone glucose or alkoxylated ethylene glucose or blends of these and 10–90% by weight of the additional polyhydric compound. More often, the blend is composed of 20–70% by weight of the alkoxylated compounds disclosed herein, and 30–80% by weight of one or more additional polyhydric or polyol compounds. The percentages just stated are based on the total weight of the blend of materials.

The polyisocyanates

Suitable polyisocyanates which may be conveniently reacted with the alkoxylated compounds described here or blends of hydroxy materials including same include a wide variety of organic diisocyanates. The following are typical members of this class; toluene diisocyanate, diphenyl diisocyanate, triphenyl diisocyanate, naphthalene diisocyanate, chlorophenyl-2,4-diisocyanate, ethylene diisocyanate, 1,4-tetramethylene diisocyanate, paraphenylene diisocyanate, hexamethylene diisocyanate, 3,3'-dimethyl-4,4'-biphenylene diisocyanate, 3,3'-dimethoxy-4,4'- biphenylene diisocyanate, diphenylmethane-4,4'-diisocyanate, etc. Mixtures of two or more of these isocyanates are contemplated.

Polyisocyanates containing more than two isocyanate groups may also be used. Illustrative of these are polymethylene polyphenyl isocyanate, such as dimethylene triphenyl triisocyanate. A commercially available polyisocyanate is known as PAPI and has an average functionality between two and three. Thus, by the term "polyisocyanate" is meant a molecule containing two or more isocyanate groups.

Foam preparation

The preparation of the urethane foams may be carried out in a variety of techniques. For example, a prepolymer may be prepared by reacting the polyol or blend of polyols and polyisocyanate in the absence of water, and thereafter a foam may be produced by the addition of excess isocyanate, catalyst, and surfactant. Water may also be added to make flexible foams.

In another method known as the one-shot method, the polyol, blowing agent, and isocyanate reactants are simultaneously mixed together and allowed to react in the presence of a catalyst.

In what is known as the semi-prepolymer technique, the polyol is partially extended with excess isocyanate to provide a reaction product containing a high percentage of free isocyanate groups, which is then foamed at a later stage by reaction with additional polyol, blowing agent and catalyst. The polyol derivative containing excess isocyanate may also be moisture cured.

The foaming reaction itself can be carried out by preforming the foam by means of isocyanate and water to form carbon dioxide. Again, foaming can also be effected by means of a blowing agent, such as a low boiling, high molecular weight gas, which vaporizes at or below the temperature of the foaming mass. Preferred blowing agents are the fluorocarbons, such as trichloromonofluoromethane, dichlorodifluoromethane, dichlorofluoromethane, 1,1-dichlro-1-fluoroethane, 1-chloro-1,1-difluoro-2,2-dichloroethane, and 1,1,1-trifluoro, 2-chloro-2-fluoro, 3,3-difluoro, 4,4,4-trifluorobutane.

A further method of forming cellular structures in polyurethane resins comprises mechanically whipping an emulsion of the liquid interpolymerizable components under appropriate conditions.

In addition to the main components, namely the polyols, and the organic polyisocyanate, the foamable mixture usually contains curing agents. Typical of these are tertiary amines, such as tetramethyl guanidine, tetramethyl - 1,3 - butanediamine (TMBDA), triethylenediamine (DABCO), dimethylethanolamine, and tin esters such as stannous oleate, stannous octoate, and dibutyl tindilaurate, etc. The amount of catalyst or curing agent usually varies in a range from about 0.1% to about 5% by weight based upon the reactive components in the foamable mixture.

Other auxiliary agents may also be present which are useful in preparing excellent foams. For example, surfactants may be utilized which are designed to assist in the maintenance of the cell structure of the foam while it is still soft and uncured. The most widely used surfactants here are silicone derivatives.

Thus, by varying conditions and/or type of blend of polyols utilized, one can realize foams either of the flexible or rigid type. Both open celled and closed celled rigid and flexible foams may be produced with equal facility.

Generally the open celled foam is made by use of water alone or in combination with fluorocarbons as a foaming agent. The water reacts with the isocyanate groups to produce urea linkages plus carbon dioxide, with the latter causing the open celled effect. Closed cell structures are made by use of hydrocarbons alone, such as by use of fluorocarbons in the absence of water.

Likewise coatings may be made by curing the polyurethane resins of the invention. Again the coatings may be made by the "one-shot" technique or prepolymer method.

In still another embodiment involving "moisture-cured" or "two-component" urethane coating applications, a prepolymer is made up in an inert organic solvent. The resultant vehicle either used per se or if further mixed with additional polyol component is applied to a substrate, and cures to hard tough films either by reaction of the free isocyanate groups with moisture in the atmosphere, or by reaction of the free isocyanate and hydroxy groups available from excess polyol.

The following examples illustrate preparation of alkoxylated monoacetone glucoses and alkoxylated ethylene glucose. Directions for forming typical foams utilizing these are also set forth. Likewise coatings were made as derived from polyurethane resins of this type. All percentages are in terms of percent by weight unless otherwise indicated.

It is understood, of course, that these examples are merely meant to be illustrative, and that the invention is not to be limited thereto.

PREPARATION OF POLYOLS

Preparations of alkoxylated ethylene glucose

Example I.—A 2-liter autoclave was charged with 206 g. (1 mol) of mixed alpha and beta-1,2-ethylene glucose, 500 ml. of xylene and 0.69 g. of potassium hydroxide dissolved in 10 ml. of methanol. The contents were heated with agitation to approximately 200° F. to 225° F., and 200 ml. of xylene stripped off under vacuum to remove any traces of water from the product. The autoclave was then sealed, evacuated, flushed with nitrogen, and evacuated again. Heating was continued, and when the temperature reached 270° F., propylene oxide addition was started at 25 p.s.i.g. The temperature was maintained between 248° F. and 270° F. and the internal pressure between 18 and 42 p.s.i.g. during the course of the reaction. After 3.33 hours, 290 g. of propylene oxide was introduced. The oxide feed was stopped and stirring continued until the internal pressure dropped to a constant value. A vacuum was applied to strip off the remaining xylene and any volatile materials. The contents were then cooled, and discharged from the kettle under nitrogen pressure. This product was treated with 0.7 g. of tartaric acid to remove the potassium catalyst, as the insoluble tartrate, and then filtered. A light-yellow, viscous resin, weighing 441 g. was obtained which had a hydroxyl number of 399, and an average molecular weight of 422.

Example II.—A 2-liter autoclave was charged with 211 g. of the product for Example I (Hydroxyl Number—399) and 0.7 g. of potassium hydroxide dissolved in 10 ml. of methanol. While stirring the contents were heated to 250° F., evacuated to remove the methanol, flushed with nitrogen, then evacuated again. Propylene oxide was added under a nitrogen pressure of 30 p.s.i.g. The reaction was maintained at 252° F. and 294° F. and the internal pressure between 20 to 30 p.s.i.g. throughout the course of the propylene oxide addition. After 1.5 hours, 210 g. of propylene oxide was introduced and the oxide feed was stopped. Stirring was continued until the internal pressure dropped to a constant value. The autoclave was then evacuated to strip off any volatiles, and the contents discharged under nitrogen pressure. The product was treated with 0.79 g. of tartaric to remove the potassium catalyst, as the insoluble tartrate, then filtered through a diatomaceous earth bed. A light-yellow, viscous material weighing 401 g., was obtained, which had a hydroxyl number of 212 and an average molecular weight of 794.

Example III.—A 2-liter stainless steel autoclave was charged with 158.8 g. of the product from Example II (Hydroxyl Number—212) and 1.01 g. of potassium hydroxide dissolved in 10 ml. of methanol. While stirring the contents were heated to 250° F., evacuated to remove the methanol, flushed with nitrogen and evacuated again. Propylene oxide was introduced under nitrogen pressure. The temperature was maintained at 252° F. to 287° F. and the internal pressure between 25 and 30 p.s.i.g.

throughout the course of the propylene oxide addition. After 6 hours, 441 of propylene oxide was introduced. The oxide feed was stopped and stirring was continued until the internal pressure dropped to a constant value. A vacuum was then applied to strip off any volatile materials and the contents discharged under nitrogen pressure. The resulting product was then treated with 1.15 g. of tartaric acid to remove the potassium catalyst, as the insoluble tartrate, and filtered through a diatomaceous earth bed. A straw-colored, low-viscosity, liquid weighing 579 g. and having a hydroxyl number of 77.3 was obtained.

Preparations of alkoxylated monoacetone glucose

Example IV.—A 2-gallon autoclave was charged with 880 g. (4 mols) of 1,2-monoacetone glucose, 1500 ml. of water and 2.97 g. of potassium hydroxide dissolved in water. The water introduced with the 1,2-monoacetone glucose was reduced to 10 to 20 percent by heating the contents slowly with agitation to 270° F. to 285° F. at atmospheric pressure. The autoclave was sealed and 235 g. (4 mols) of propylene oxide was added in 45 minutes at 35 p.s.i.g. on a demand basis. When this quantity of oxide had reacted, a vacuum was applied to strip off the remaining water. Propylene oxide addition was then resumed at 25 to 30 p.s.i.g. until 700 g. had been added in 34 minutes. The temperature was maintained at 270° F. to 290° F. A vacuum was applied to remove any volatiles from the product. The catalyst was neutralized with 3.42 g. of tartaric acid to form an insoluble salt which was filtered from the product through a bed of diatomaceous earth. A brown, viscous liquid weighing 1689 g. with a 406 hydroxyl number was obtained.

Example V.—A 2-liter stainless steel autoclave was charged with 220 g. (1 mol) of 1,2-monoacetone glucose, 500 ml. xylene, and .70 g. of potassium hydroxide dissolved in 10 ml. of methanol. The contents were heated with agitation to approximately 200° F. to 225° F., and 250 ml. of xylene stripped off under vacuum to remove any traces of water from the product. The autoclave was then sealed and flushed with nitrogen. When the temperature reached 250° F., propylene oxide addition was started at 35 p.s.i.g. The temperature was maintained at 250° F. to 285° F. and the internal pressure at 30 to 35 p.s.i.g. during the reaction. After 2.2 hours, 341 g. of propylene oxide was added. The oxide feed was stopped and stirring continued until the internal pressure dropped to a constant value. A vacuum was applied to stip off the remaining xylene and any volatile materials. The contents were then cooled and discharged from the kettle under nitrogen pressure. The product was treated with 0.8 g. of tartaric acid to remove the potassium as the insoluble tartrate and filtered. A medium brown, viscous resin weighing 528 g. was obtained which had a hydroxyl number of 294.

Example VI.—A 2-liter autoclave was charged with 350 g. of the product of Example V (Hydroxyl No. 294) 100 ml. of toluene, and .59 g. of potassium hydroxide in methanol. While stirring, the reactants were heated to 225° F., evacuated to remove the toluene and methanol, flushed with nitrogen, then evacuated again. Propylene oxide was introduced under a nitrogen pressure of 35 p.s.i.g. The reaction temperature was maintained between 280° F. and 295° F. and the internal pressure between 30 and 35 p.s.i.g. throughout the course of the reaction. After .93 hour, 160 g. of propylene oxide was added and the oxide feed was stopped. Stirring was continued until the internal pressure dropped to a constant value. The autoclave was then evacuated to remove any volatiles. To remove the potassium catalyst as the insoluble tartrate, the product was treated with .67 g. of tartaric acid. The product was then filtered through a diatomaceous earth bed. A medium-yellow, viscous material weighing 495 g. with a hydroxyl number of 209 was obtained.

Example VII.—A 2-liter autoclave was charged with 161 g. of the product from Example VI (Hydroxyl No. 209) in xylene and 1.01 g. of potassium hydroxide in methanol. The contents were heated with agitation to 225° F. to 250° F. and the xylene and methanol were stripped off under vacuum. The clave was flushed with nitrogen, and evacuated again. The propylene oxide was added under 30 p.s.i.g. nitrogen pressure. The temperature of the reactants was maintained at 270° F. to 290° F. and an internal pressure of 25 to 30 p.s.i.g. throughout the course of the propylene oxide addition. After 4.2 hours, 439 g. of propylene oxide was introduced. Oxide addition was discontinued, and the internal pressure was allowed to decrease to a constant value. A vacuum was applied to remove any volatiles from the material. The product was treated with 1.16 g. of tartaric acid to remove the potassium catalyst as the insoluble tartrate, and filtered through a diatomaceous earth bed. A yellow-colored low viscosity liquid weighing 575 g. and having a hydroxyl number of 68 was obtained.

Preparation of foams

Example VIII.—To a paper cup was added 100 g. of the propylene oxide derivative of alpha and beta 1,2-ethylene glucoses from Example I (Hydroxyl Number—399), 1.0 g. of tetramethyl butanediamine, 0.025 g. of dibutyltin dilaurate, 2 g. of a silicone emulsifier, and 39 g. of trichloromonofluoromethane. The ingredients were mixed thoroughly, then 101 g. of polymethylene polyphenylisocyanate (PAPI) was added and vigorous agitation continued for 25 seconds. The contents were immediately transferred to a cardboard container and allowed to foam. In 200 seconds the foam stopped rising and was tack-free after 260 seconds. The resulting fine-cell, rigid foam had a density of 1.6 pounds per cubic foot.

Example IX.—To a paper cup was charged 100 g. of the propylene oxide reaction product of alpha and beta 1,2-ethylene glucose from Example II (Hydroxyl Number—212), 1.5 g. of tetramethyl butanediamine, 0.05 g. of dibutyltin dilaurate, 2 g. of a silicone emulsifier, and 32 g. of trichloromonofluoromethane. The contents were thoroughly mixed, then 53.5 g. of polymethylene polyphenylisocyanate (PAPI) was added and vigorous agitation continued for 20 seconds. The contents were immediately transferred to a cardboard container to foam. The material continued to rise for 135 seconds and was tack-free after 143 seconds. The resulting extremely fine-cell, rigid product had a density of 1.8 pounds per cubic foot.

Example X.—To a paper cup was added 100 g. of the propylene oxide derivative of alpha and beta 1,2-ethylene glucose from Example III (Hydroxyl Number—77.3), 0.5 g. of a triethylenediamine, 0.1 g. of stannous octoate, 3.4 g. of water and 2.0 g. of a silicone emulsifier. The contents were thoroughly mixed and then 51 g. of toluene diisocyanate (80/20 mixture) added. Vigorous agitation was continued for five seconds and the contents immediately transferred to a cardboard container to foam. After 60 seconds, the foam had risen to its maximum height and became tack-free in 300 seconds. The resulting flexible foam had an extremely fine, uniform cell structure.

Example XI.—To a three necked glass flask, equipped with a water-cooled condenser, thermometer, nitrogen sparge tube and dropping funnel, was charged 66 g. of toluene diisocyanate (0.378 mol equal to 0.756 equivalent of isocyanate groups) dissolved in 83 g. of Cellosolve acetate. While stirring under a nitrogen atmosphere at room temperature, 100 g. of the propylene oxide reaction product of alpha and beta 1,2-ethylene glucose of Example II, dissolved in 83 g. of xylene, was added slowly over a period of 30 minutes. During this addition, the temperatures of the reactants was maintained between 77° F. and 95° F. When the last of the xylene solution had been incorporated, the temperature was raised to 185° F., and held for 3.5 hours. The reaction mixture was then cooled to room temperature and transferred to a container for storage.

The resulting light-yellow solution contained 50 percent nonvolatile material. A film of this solution cast on tinplate became tack-free after 2.5 hours. After one week the cured film was not affected by 5 percent sodium hydroxide on 8 hours contact, and by 5 percent hydrochloric acid solution after 48 hours contact. The coated tinplate also passed a one-eighth inch Mandrel bend without failure.

Example XII.—To a paper cup was added 100 g. of the propylene oxide derivative of 1,2-monoacetone glucose from Example IV (Hydroxyl No. 406), 1.2 g. of tetramethyl butanediamine, 0.025 g. of dibutyltin dilaurate, 2.0 g. of a silicone emulsifier, and 40 g. of trichloromonofluoromethane. The ingredients were mixed thoroughly, then 105 g. of diphenylmethane diisocyanate (MDI) was added and vigorous agitation continued for seven seconds. The contents were immediately transferred to a cardboard container and allowed to foam. In 40 seconds the foam stopped rising and was tack-free. The resulting fine-celled rigid foam had a density of 1.7 pounds per cubic foot.

Example XIII.—To a paper cup was added 100 g. of the propylene oxide reaction product of 1,2-monoacetone glucose from Example V (Hydroxyl No. 294), 1.0 g. of tetramethyl butanediamine, 0.05 g. of dibutyltin dilaurate, 2.0 g. of a silicone emulsifier and 40 g. of trichloromonofluoromethane. The contents were thoroughly mixed, then 73.5 g. of polymethylene polyphenylisocyanate (PAPI) was added and vigorous agitation continued for 20 seconds. The ingredients were immediately transferred to a cardboard container to foam. The material continued to rise for 170 seconds and was tack-free after 196 seconds. The resulting fine-celled, rigid foam had a density of 1.7 pounds per cubic foot.

Example XIV.—To a paper cup was added 100 g. of the propylene oxide derivative of 1,2-monoacetone glucose from Example VI (Hydroxyl No. 209), 1.0 g. of tetramethyl butanediamine, 2.0 g. of a silicone emulsifier, 0.05 g. of dibutyltin dilaurate, and 34 g. of trichloromonofluoromethane. The contents were thoroughly mixed, then 552.6 of polymethylene polyphenylisocyanate (PAPI) was added and vigorous agitation continued for 20 seconds. The contents were immediately transferred to a cardboard container to foam. In 138 seconds, the foam stopped rising and was tack-free after 145 seconds. The resulting fine cell rigid product had a density of 1.9 pounds per cubic foot.

Example XV.—To a paper cup was added 100 g. of the propylene oxide derivative of 1,2-monoacetone glucose from Example VII (Hydroxyl No. 68, 0.5 g. of triethylenediamine, 0.1 g. of stannous octoate, 3.4 g. of water, and 2.0 g. of a silicone emulsifier. The contents were thoroughly stirred, then 52 g. of toluene diisocyanate was added and vigorous agitation continued for 5 seconds. The material was immediately transferred to a cardboard container to foam. After 65 seconds the foam had risen to its maximum height and became tack-free in 340 seconds. The resulting flexible foam had an extremely fine, uniform cell structure.

Example XVI.—To a three necked glass flask, equipped with a water cooled condenser, thermometer, nitrogen sparge tube and dropping funnel was charged 65 g. of toluene diisocyanate (0.372 mol equal to 0.744 equivalent of isocyanate groups) dissolved in 83 g. of Cellosolve acetate. While stirring under a nitrogen atmosphere at room temperature, 100 g. of the propylene oxide reaction product of 1,2-monoacetone glucose of Example VI, dissolved in 83 g. of xylene, was added slowly over a period of 30 minutes. During this addition, the temperature of the reactants was maintained between 77° F. and 95° F. When the last of the xylene solution had been incorporated, the temperature was raised to 185° F. and held for 3.5 hours. The reaction mixture was then cooled to room temperature and transferred to a container for storage. The resulting light yellow solution contained 50 percent non-volatile material. A film of this solution cast on tin-plate became tack-free after 2.5 hours. After one week the cured film was not affected by 5 percent sodium hydroxide on eight hours contact and by 5 percent hydrochloric acid solution after 48 hours contact. The coated tin plate also passed a one-eighth inch Mandrel bend without failure.

The term "polyol" as derived herein refers to a chemical compound formed from a polyhydric alcohol, which compound contains a plurality of ether linkages in addition to two or more terminal hydroxyl groupings. The term "polyhydric" then encompasses polyol derivatives therefrom.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A polyurethane resin which is formed from a reaction mixture comprising:
   (A) an organic polyisocyanate, and
   (B) a polyol selected from the group consisting of alkoxylated monoacetone glucose, alkoxylated ethylene glucose, and mixtures thereof, said polyol having a molecular weight ranging from about 350 to about 5000, and a hydroxyl number ranging from about 40 to about 500.

2. The resin of claim 1 wherein said polyol is alkoxylated monoacetone glucose.

3. The resin of claim 1 wherein said polyol is alkoxylated ethylene glucose.

4. The resin of claim 2 wherein said alkoxylated monoacetone glucose is propoxylated monoacetone glucose.

5. The resin of claim 3 wherein said alkoxylated ethylene glucose is propoxylated ethylene glucose.

6. The resin of claim 1 which is formed from a reaction mixture comprising 1–3 parts of said polyisocyanate and 1–3 parts of said polyol.

7. The resin of claim 1 which is in the form of a cellular plastic.

8. The resin of claim 1 which is in the form of a thin coating.

9. A polyurethane resin which is formed from a reaction mixture comprising:
   (A) an organic polyisocyanate, and
   (B) a blend of polyhydric compounds comprising:
      (1) a polyol selected from the group consisting of alkoxylated monoacetone glucose, alkoxylated ethylene glucose, and mixtures thereof, said polyol having a molecular weight ranging from about 350 to about 5000, and a hydroxyl number ranging from about 40 to about 500, and
      (2) an additional differing polyhydric compound.

10. The resin of claim 9 wherein said additional polyhydric compound also contains ether linkages.

11. The resin of claim 9 wherein said blend comprises 10–90% by weight of said polyol and 10–90% by weight of said additional polyhydric compound, said weight percentages being based on total weight of said blend.

12. The resin of claim 11 wherein said blend comprises 20–70% by weight of said polyol and 30–80% by weight of said additional differing polyhydric compound.

13. The resin of claim 9 wherein said polyol is propoxylated monoacetone glucose.

14. The resin of claim 9 wherein said polyol is propoxylated ethylene glucose.

15. The resin of claim 9 which is formed from a reaction mixture comprising 1–3 parts of said polyisocyanate and 1–3 parts of said blend of polyhydric compounds.

16. The resin of claim 9 which is in the form of cellular plastic.

17. The resin of claim 9 which is in the form of a thin coating.

References Cited

UNITED STATES PATENTS

| 3,073,788 | 1/1963 | Hostettler | 260—2.5 |
| 3,167,538 | 1/1965 | Kaiser et al. | 260—210 |
| 3,202,620 | 8/1965 | Merten et al. | 260—2.5 |
| 3,305,535 | 2/1967 | Merten et al. | 260—77.5 |
| 3,324,108 | 6/1967 | Moller et al. | 260—209 |

FOREIGN PATENTS

| 708,661 | 4/1965 | Canada | 260—2.5 |
| 727,686 | 2/1966 | Canada | 260—2.5 |

DONALD E. CZAJA, Primary Examiner

F. E. McKELVEY, Assistant Examiner

U.S. Cl. X.R.

117—161; 260—9, 209, 210, 233.3